(12) United States Patent
Heberling et al.

(10) Patent No.: US 10,053,116 B2
(45) Date of Patent: Aug. 21, 2018

(54) OPERATOR COMPARTMENT FOR A RAIL VEHICLE, ASSEMBLY DEVICE FOR A TRACK CAMERA, AND FRONT WINDOW ROLL-UP SUN SHIELD OF A RAIL VEHICLE

(71) Applicant: SIEMENS AKTIENGESELLSCHAFT, Munich (DE)

(72) Inventors: Joern Heberling, Dessau (DE); Markus Mehlan, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 179 days.

(21) Appl. No.: 15/111,912

(22) PCT Filed: Jan. 15, 2014

(86) PCT No.: PCT/EP2014/050684
§ 371 (c)(1),
(2) Date: Jul. 15, 2016

(87) PCT Pub. No.: WO2015/106806
PCT Pub. Date: Jul. 23, 2015

(65) Prior Publication Data
US 2016/0332640 A1 Nov. 17, 2016

(51) Int. Cl.
*B61C 17/04* (2006.01)
*E06B 9/44* (2006.01)
(Continued)

(52) U.S. Cl.
CPC ............... *B61C 17/04* (2013.01); *E06B 9/44* (2013.01); *E06B 9/46* (2013.01); *G03B 29/00* (2013.01);
(Continued)

(58) Field of Classification Search
CPC . B60R 11/04; B61C 17/04; E06B 9/44; E06B 9/46; G03B 29/00; H04N 7/183
See application file for complete search history.

(56) References Cited

U.S. PATENT DOCUMENTS

2014/0061414 A1\* 3/2014 Tai .......................... B60R 11/00
248/288.11

FOREIGN PATENT DOCUMENTS

| CN | 201033565 | \* | 8/2008 |
| DE | 19743306 A1 | | 4/1999 |
(Continued)

*Primary Examiner* — Mark T Le
(74) *Attorney, Agent, or Firm* — Laurence Greenberg; Werner Stemer; Ralph Locher

(57) ABSTRACT

An operator compartment of a rail vehicle includes two front windows separated by a connection beam, a track monitoring camera attached in a lower region of the connection beam by a fastening device, and a front window roll-up sun shield which can be drawn in the interior of the operator compartment and has guides running along both sides of the front windows. The guides have lower retaining devices. In order to allow a comparably simple attachment of the roll-up sun shield and the track monitoring camera in the operator compartment, a longitudinal member is attached to a lower region of the connection beam. The longitudinal member retains the fastening device, has mutually opposite guides and has the lower retaining devices for the roll-up sun shield. An assembly device for a track camera and a front window roll-up sun shield of a rail vehicle is also provided.

6 Claims, 3 Drawing Sheets

(51) Int. Cl.
*E06B 9/46* (2006.01)
*G03B 29/00* (2006.01)
*H04N 7/18* (2006.01)
*B60J 1/20* (2006.01)
*B60R 11/04* (2006.01)

(52) U.S. Cl.
CPC ............ *H04N 7/183* (2013.01); *B60J 1/2077* (2013.01); *B60R 11/04* (2013.01)

(56) References Cited

FOREIGN PATENT DOCUMENTS

| | | | |
|---|---|---|---|
| DE | 202006011455 | * | 1/2007 |
| EP | 2628649 | A1 | 8/2013 |
| WO | 1994025324 | A1 | 11/1994 |

* cited by examiner

OPERATOR COMPARTMENT FOR A RAIL VEHICLE, ASSEMBLY DEVICE FOR A TRACK CAMERA, AND FRONT WINDOW ROLL-UP SUN SHIELD OF A RAIL VEHICLE

BACKGROUND OF THE INVENTION

Field of the Invention

The invention relates to an operator compartment of a rail vehicle with two front windows divided by a connection beam, with a track observation camera attached in the lower region of the connection beam by means of a fastening device and with front window roll-up sun shields which can be pulled down in the interior of the operator compartment, which roll-up sun shields have guides running along both sides of the front window with lower retaining devices.

In a known operator compartment, predefined installation positions are adhered to in this manner for both the front window roll-up sun shield as well as for the track observation camera, by the guides of the front window roll-up sun shields being fastened to the vehicle body or to inner paneling of the vehicle body by means of their upper and lower retaining devices. The track observation camera is for its part connected via a fastening device to the vehicle body or its inner paneling. Its position must lie in the wipe area of the windshield wipers and its field of view may not be impaired by the front window roll-up blinds. These demands are relatively difficult to implement in the front region of the operator compartment in terms of construction and assembly.

BRIEF SUMMARY OF THE INVENTION

The object of the invention is to propose an operator compartment of a rail vehicle, in which the front window roll-up sun shields and the track observation camera can be attached in a comparatively simple manner.

To achieve this object, in the case of an operator compartment of a rail vehicle of the type mentioned in the introduction, according to the invention a longitudinal member is attached to the connection beam in the lower region thereof, on which longitudinal member the fastening device of the track observation camera is retained and which has mutually adjacent guides and the lower retaining devices for the front window roll-up sun shields.

A significant advantage of the operator compartment according to the invention is considered to be that the lower retaining devices of the mutually adjacent guides of the two front window roll-up sun shields and the fastening device of the track observation camera can be attached to the connection beam by means of a single component, namely the longitudinal member, whereby the necessary installation space and the weight are reduced. In addition, there are comparatively few connection points with the vehicle body—only the longitudinal member has to be connected to the vehicle body—and the assembly effort is also reduced. Furthermore, the affixing of the track observation camera and the front window roll-up sun shields by means of the longitudinal member fits into the overall paneling surface smoothly. It should also be noted that the longitudinal member can be pre-assembled with the lower retaining devices for the front window roll-up blinds and the fastening device for the track observation camera, so that only the longitudinal member has to be assembled when equipping the rail vehicle.

The fastening device of the track observation camera can be retained on the longitudinal member in various ways; it is considered particularly advantageous if the longitudinal member has, as fastening device for the track observation camera, a cross hole for receiving a fastening rod retaining the track observation camera. By rotating the fastening rod about its longitudinal axis in the cross hole, the track observation camera can then be easily brought into the desired position.

In the context of the invention, it appears to be further advantageous if a cross member is attached to the connection beam in the upper region thereof, the cross member having mutually adjacent upper retaining devices for the front window roll-up sun shields. Having a cross member of this type in addition to the longitudinal member also results in a simple opportunity for easily retaining the front window roll-up sun shields in the region of the connection beam, without providing particular assembly devices on the vehicle body for each upper retaining device of the front window roll-up sun shields.

It is also deemed advantageous if the longitudinal member is connected to the cross member by means of a connecting element while forming a single member for the track observation camera and the two mutually adjacent guides of the front window roll-up sun shields. In this case, both the track observation camera and also the two adjacent guides of the front window roll-up sun shields can be retained by a single member, which only has to be attached to the connection beam per se.

The invention further relates to an assembly device with a fastening device for a track observation camera and with guides and lower retaining devices of mutually adjacent front window roll-up sun shields in the region of a connection beam of the front window of an operator compartment of a rail vehicle.

An assembly device of this kind is provided in the prior art described in the introduction and comprises a fastening device for the track observation camera and for guides and lower retaining devices of the front window roll-up sun shield attached to the vehicle body in the region of the connection beam per se.

The invention has the object of embodying an assembly device of the known design such that with it the front window roll-up sun shields and the track observation camera can be attached in the region of the connection beam in a comparatively simple manner.

To achieve this object, according to the invention the assembly device has a longitudinal member which can be attached to the connection beam in the lower region thereof, on which the fastening device of the track observation camera is retained and which is embodied to receive the guides and the lower retaining devices of the front window roll-up sun shields.

This similarly allows the same advantages to be achieved as have already been specified in connection with the operator compartment according to the invention.

With the assembly device according to the invention, the longitudinal member can be embodied in a different manner from the fastening device for the track observation camera. In a preferred form of embodiment, the longitudinal member has, as fastening device for the track observation camera, a cross hole for receiving a fastening rod retaining the track observation camera.

It can be further advantageous if the longitudinal member is connected via a connecting element to a cross member for the upper retaining devices of the front window roll-up blinds which can be attached to the connection beam in the upper region thereof, forming a single member for the track observation camera and the guides as well as the retaining devices of the two adjacent front window roll-up sun shields.

BRIEF DESCRIPTION OF THE SEVERAL VIEWS OF THE DRAWING

To further explain the invention.

DESCRIPTION OF THE INVENTION

Figure 1:
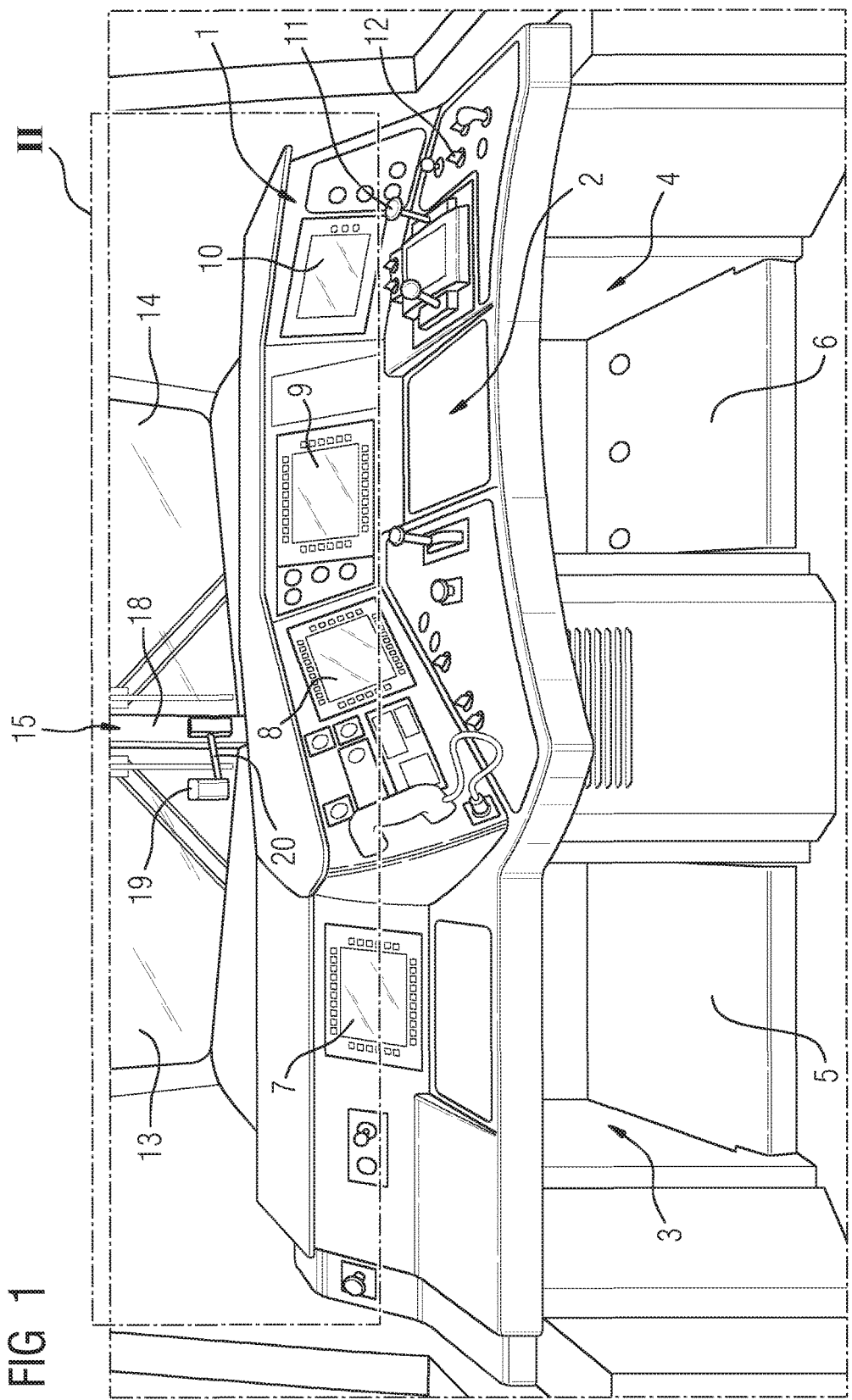
FIG. 1 shows a view of an exemplary embodiment of the operator compartment of a rail vehicle according to the invention.

As shown in FIG. 1, a depicted operator compartment 1 of a rail vehicle (not shown in further detail) for two rail vehicle operators is established, for which there is space in front of an operating console 2 on seats (not shown) next to each other. Below the operating console 2 are located cavities 3 and 4, in which foot pedestals 5 and 6 for achieving an optimum sitting position for the respective rail vehicle operators are located.

Among other things, a number of monitors 7, 8, 9 and 10 and a number of levers 11 and switches 12 are attached to the operating console 2 for the operation of the rail vehicle.

Figure 2:
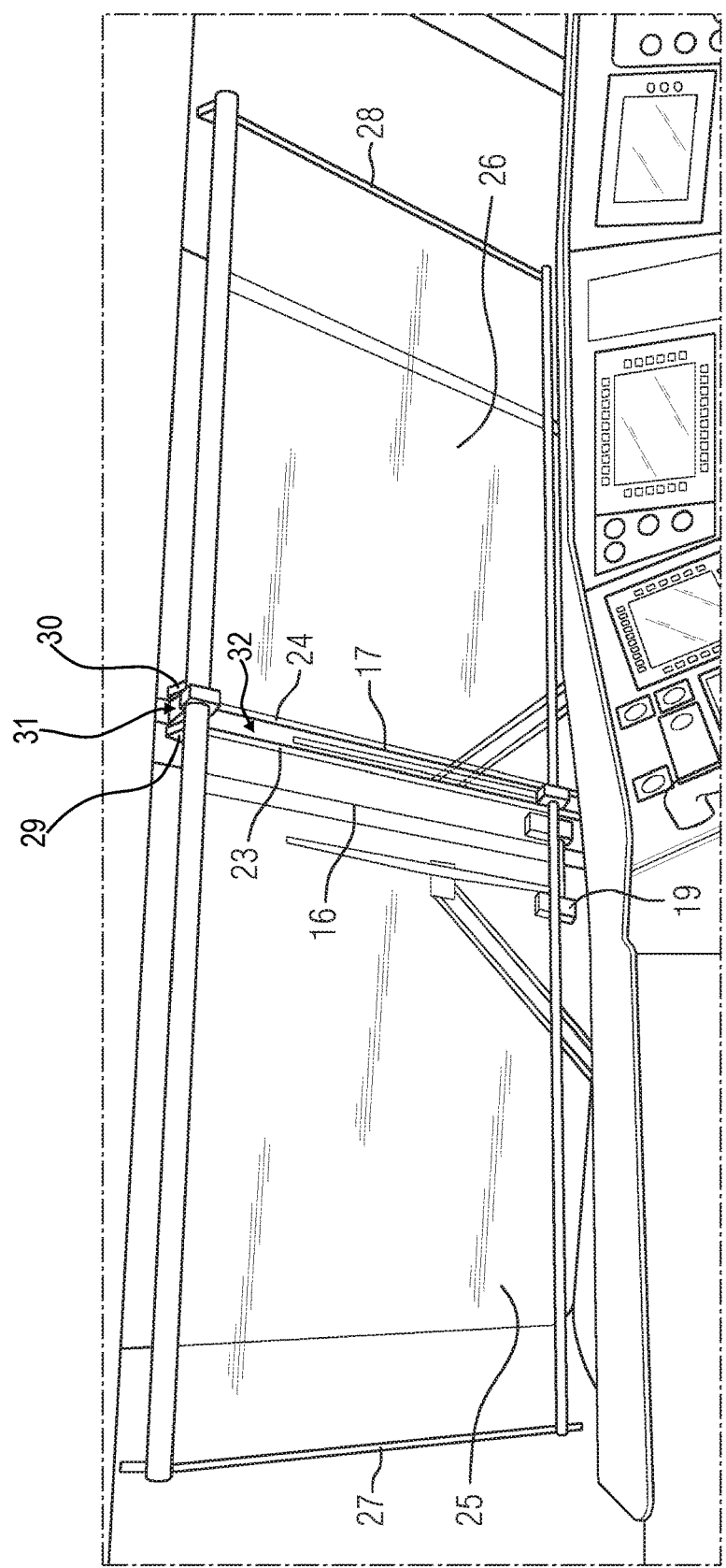
FIG. 2 shows an enlarged view of section A according to FIG. 1

As FIG. 1 further shows, the operating console 2 of the operator compartment 1 is installed in front of two front windows 13 and 14, which are connected to one another by means of a connection beam 15 at their edges 16 and 17 which face each other (see also FIG. 2).

Figure 3:
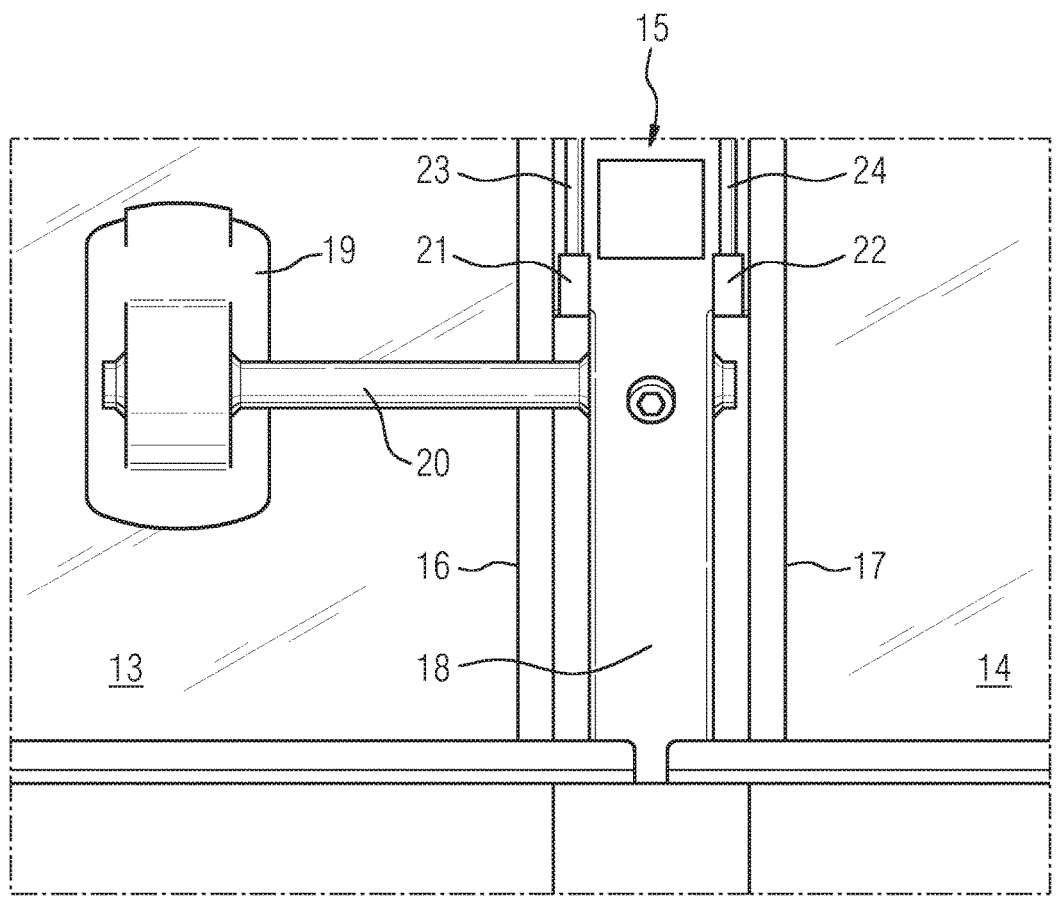
FIG. 3 shows an exemplary embodiment of the longitudinal member in an enlarged view.

A longitudinal member 18 is attached to the connection beam 15, which can be recognized particularly well in FIG. 3. A track camera 19 is held on the longitudinal member 18 (see also FIG. 3), which camera 19 is retained via a fastening rod 20 in a cross hole of the longitudinal member 18. As can be seen in turn in FIG. 3 in particular, the longitudinal member 18 is provided at its upper end in FIG. 3 with lower retaining devices 21 and 22 of front window roll-up sun shields 25 and 26 which can be guided into guides 23 and 24.

As can be seen in FIG. 2 in particular, the front window roll-up sun shields 25 and 26 additionally have outer guides 27 and 28. These further guides 27 and 28 are fastened to the vehicle body of the rail vehicle in the known manner.

As is shown in the Figures the guides 23 and 24 of the front window roll-up sun shields 25 and 26 can be optionally fastened with their upper retaining devices 29, 30 by means of a cross member 31 to the connection beam 15, which is advantageous since then only the cross member is also to be connected to the connection beam 15 per se. The longitudinal member 18 is connected to the cross member 31 by a connecting element 32.

The invention claimed is:

1. An operator compartment of a rail vehicle, the operator compartment comprising:
   two front windows having sides;
   a connection beam separating said two front windows, said connection beam having a lower region;
   a track observation camera;
   a longitudinal member attached to said lower region of said connection beam;
   fastener retained on said longitudinal member, said fastener attaching said track observation camera to said lower region of said connection beam;
   front window roll-up sun shields configured to be pulled down in an interior of the operator compartment;
   said longitudinal member including mutually-oppositely disposed guides running along said sides of said front windows for said roll-up sun shields; and
   said longitudinal member including lower retainers for said roll-up sun shields.

2. The operator compartment according to claim 1, wherein said fastener retaining said track observation camera is a fastening rod, and said longitudinal member has a cross hole for receiving said fastening rod and acting as a fastener for said track observation camera.

3. The operator compartment according to claim 1, wherein said connection beam has an upper region, a cross member is attached to said upper region of said connection beam, and said cross member includes mutually adjacent upper retainers for said front window roll-up sun shields.

4. The operator compartment according to claim 3, which further comprises a connector connecting said longitudinal member to said cross member; and
   wherein said connector, said longitudinal member and said cross member forming a single carrier for mounting said track observation camera, said two mutually-opposite guides for said front window roll-up sun shields and said upper and lower retainers for said front window roll-up sun shields.

5. In a rail vehicle including an operator compartment having front windows with a connection beam, mutually-adjacent front window roll-up sun shields in a vicinity of the connection beam, guides and lower retainers for the front window roll-up sun shields, a track observation camera and a fastener for the track observation camera, an assembly device, comprising:
   a longitudinal member to be attached to a lower region of the connection beam;
   said longitudinal member retaining the fastener for the track observation camera;
   said longitudinal member configured to receive the guides and the lower retainers for the front window roll-up sun shields;
   the fastener being a fastening rod for retaining the track observation camera; and
   said longitudinal member having a cross hole formed therein for receiving the fastening rod and acting as a fastener for the track observation camera.

6. The assembly device according to claim 5, further comprising:
   upper retainers for the front window roll-up sun shields, said upper retainers are attached to an upper region of the connection beam; and
   a connector connects a cross member for the upper retainers to said longitudinal member, said connector, said cross member and said longitudinal member forming a single carrier for mounting the track observation camera, the guides and the upper and lower retainers for the front window roll-up sun shields.

* * * * *